United States Patent
Meyer et al.

(10) Patent No.: US 9,476,719 B2
(45) Date of Patent: Oct. 25, 2016

(54) ROUTE-BASED DISTANCE TO EMPTY CALCULATION FOR A VEHICLE

(71) Applicant: Ford Global Technologies, LLC, Dearborn, MI (US)

(72) Inventors: Jason Meyer, Canton, MI (US); Sangeetha Sangameswaran, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/474,069

(22) Filed: Aug. 29, 2014

(65) Prior Publication Data
US 2016/0061610 A1    Mar. 3, 2016

(51) Int. Cl.
G01C 21/26    (2006.01)

(52) U.S. Cl.
CPC .................................... G01C 21/26 (2013.01)

(58) Field of Classification Search
CPC combination set(s) only.
See application file for complete search history.

(56) References Cited

U.S. PATENT DOCUMENTS

| | | | | |
|---|---|---|---|---|
| 8,527,122 B2 * | 9/2013 | Yamada | ................... | B60K 6/46 180/65.265 |
| 8,838,318 B2 * | 9/2014 | Segawa | ................... | G01C 21/34 701/22 |
| 9,014,959 B2 * | 4/2015 | Kanno | ............... | G01C 21/3469 701/123 |
| 9,079,507 B2 * | 7/2015 | Smith | ................. | B60L 11/1877 |
| 9,132,746 B2 * | 9/2015 | Enomoto | ............ | B60L 11/1862 |
| 9,139,095 B2 * | 9/2015 | Kim | ......... | B60L 1/003 |
| 2012/0176231 A1 | 7/2012 | Skaff et al. | | |
| 2012/0179395 A1 | 7/2012 | Gilman et al. | | |
| 2013/0073113 A1 | 3/2013 | Wang et al. | | |
| 2013/0079962 A1 * | 3/2013 | Ishikawa | ............. | B60L 15/2045 701/22 |
| 2013/0151056 A1 * | 6/2013 | Nakano | .......................... | 701/22 |
| 2013/0253740 A1 | 9/2013 | Kim | | |
| 2013/0311016 A1 | 11/2013 | Kim | | |
| 2014/0025255 A1 * | 1/2014 | Xiaoli | ................. | B60L 11/1861 701/34.4 |
| 2014/0143002 A1 * | 5/2014 | Aisu | ......................... | 705/7.18 |

OTHER PUBLICATIONS

Estimating an Electric Vehicle's Distance to Empty Using Both Past and Future Route Information, Lennon Rodgers, DETC2013-12880, pp. 1-9.

* cited by examiner

Primary Examiner — Thomas Tarcza
Assistant Examiner — Edward J Pipala
(74) Attorney, Agent, or Firm — James P. Muraff; Neal, Gerber & Eisenberg LLP

(57) ABSTRACT

A vehicle includes an electric machine configured to provide torque to vehicle wheels, a battery electrically coupled with and configured to provide electric power to the electric machine, a display configured to signal information to an operator, and a processor. The processor is configured to present a vehicle driving range on the display. The vehicle driving range is based on a known vehicle route including at least one route segment, an estimated energy usage for the route segment, an available battery charge, and stored energy consumption data from previous drive cycles.

20 Claims, 9 Drawing Sheets

ROUTE-BASED DISTANCE TO EMPTY CALCULATION FOR A VEHICLE

TECHNICAL FIELD

This disclosure generally relates to an energy estimation system, apparatus, method, and process for estimating an energy consumption of an on-board vehicle battery. More particularly, the disclosure describes an energy estimation system, apparatus, method, and process for calculating a distance to empty (DTE) prediction for an on-board vehicle battery based on, at least, a known driving route segment for the vehicle and one or more energy consumption estimations for the vehicle.

BACKGROUND

A vehicle expends energy in order to generate the propulsion for moving the vehicle along a route. The energy expended by the vehicle may be considered in terms of energy consumption by the vehicle, wherein the vehicle's energy consumption may be measured in terms of fuel consumption, electric battery consumption, or some combination of the two, as well as other type of energy consumption capable of generating the propulsion for moving the vehicle.

For example, a battery electric vehicle (BEV) may be propelled by operation of an electric machine configured to receive electrical power from an on-board vehicle battery. The on-board vehicle battery may be charged with electrical power from a utility grid or other off-board power source.

A driver of such a BEV may desire to be accurately informed on the vehicle's DTE driving range during the course of a trip.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

Exemplary embodiments may provide a distance to empty (DTE) prediction tool for generating a DTE driving range prediction for a vehicle whose propulsion is generated, at least in part, by one or more on-board vehicle batteries. The DTE prediction tool may generate the DTE driving range prediction according to one or more of the features, processes, and/or methods described herein.

The DTE prediction tool may be configured to generate both a DTE driving range prediction based on a predicted energy consumption rate for a known driving route, as well as generate an ongoing DTE driving range prediction based on a global average energy consumption rate when the vehicle's driving route is not known.

The DTE prediction tool may partition a known vehicle driving route into a plurality of road segments, each with an associated length so that the DTE prediction tool may generate an energy consumption estimate for each road segment. In such embodiments, the plurality of road segments may include a first segment with a first length and a first estimated energy usage, and a second segment with a second length and a second estimated energy usage. It follows that the available battery charge of the on-board vehicle battery may be found to be enough to cover the energy consumption estimate for traversing the first segment, but not enough to traverse the entirety of the second segment. When the available battery charge is found to be less than the energy consumption estimate for traversing all of the road segments that comprise a known driving route for the vehicle, the DTE prediction tool may identify a location along the road segment where the vehicle battery is estimated to go below a minimum charge threshold (e.g., not enough charge to provide adequate energy to propel the vehicle). The DTE driving range may be further based on a correction factor implemented in a feedback loop.

Embodiments according to the present disclosure provide a number of advantages. For example, the present disclosure provides an accurate estimation of vehicle range. Methods according to the present disclosure provide responsive recalculations based on changes in driving patterns. In addition, methods according to the present disclosure provide continuous range estimates.

It follows that a vehicle capable of generating an accurate vehicle driving range is provided. The vehicle may include an electric machine configured to provide drive torque to vehicle wheels; a battery electrically coupled with and configured to provide electric power to the electric machine; a processor configured to generate a vehicle driving range based, at least in part, on a known vehicle driving route, an energy consumption estimate for the known vehicle driving route, and an available battery charge, and a display configured to present the vehicle driving range.

It also follows that a method for controlling an electric vehicle may be provided. The method may comprise controlling an electric machine to provide drive torque to one or more vehicle wheels, wherein the electric machine is electrically coupled to a battery that provides electric power to the electric machine; generating, by a processor, a vehicle driving range based, at least in part, on a known vehicle driving route, an energy consumption estimate for the known vehicle driving route, and an available battery charge, and controlling a display to display the vehicle driving range.

It also follows that a computing apparatus for controlling a vehicle may be provided. The computing apparatus may include a memory configured to store an energy consumption estimate for a known vehicle driving route; and a processor in communication with the memory, wherein the processor may be configured to: generate a vehicle driving range based, at least in part, on the known vehicle driving route, the energy consumption estimate, and an available battery charge for a vehicle battery, and control a display to display the vehicle driving range.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION

Figure 1:
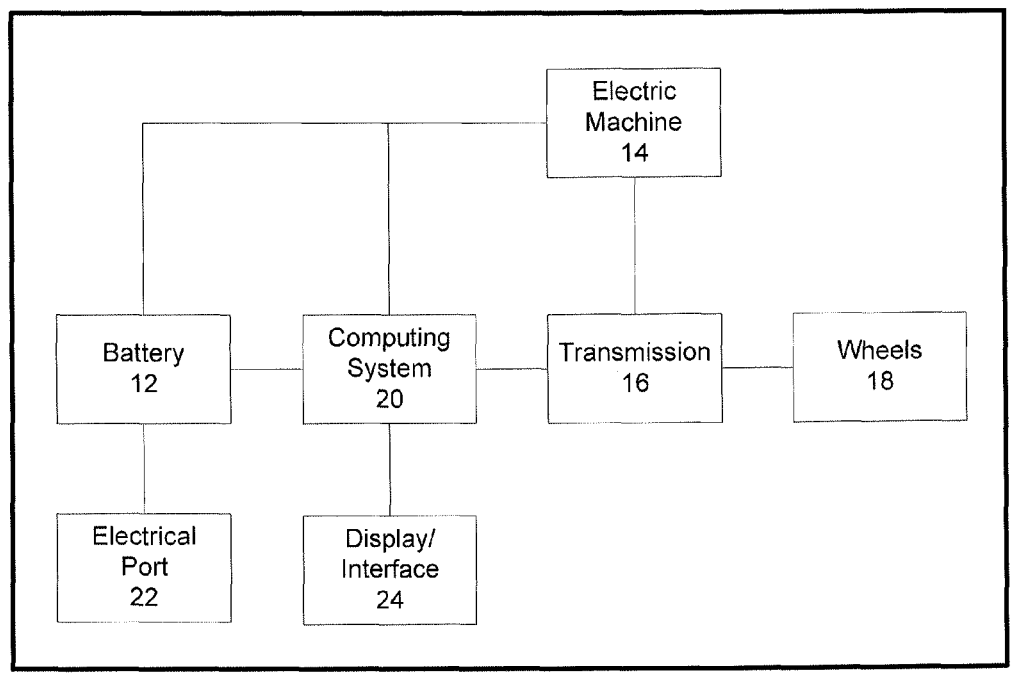
FIG. 1 illustrates an exemplary block diagram of a battery electric vehicle.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

It should be noted that in some embodiments, reference may be made in this disclosure to a road segment and a route segment interchangeably.

Due to the relative lack of adequate charging stations that may quickly charge one or more vehicle batteries of a vehicle that relies, at least in part, on the one or more vehicle batteries to power the vehicle propulsion system, it is an important goal for such vehicles (e.g., hybrid vehicles, plug-in hybrid vehicles, or battery electric vehicles) to be capable of providing an accurate distance to empty (DTE) driving range prediction. Therefore, it is one of the goals of this disclosure to provide a description of a DTE prediction tool for providing an accurate DTE driving range prediction for a vehicle.

The DTE prediction tool may be a program, application, and/or some combination of software and hardware that is incorporated on one or more of the components that comprise the vehicle's operating system. Further description for the DTE prediction tool and the components of the vehicle system running the DTE tool is further provided below.

For exemplary purposes, a vehicle according to the present disclosure may be a BEV that includes an electric machine configured to provide torque to vehicle wheels, a battery electrically coupled with and configured to provide electric power to the electric machine, a display configured to signal information to an operator, a memory unit, and a computing system. The computing system may include a processor or controller that may be configured to run the DTE prediction tool such that information stored on the memory unit is referenced in order to calculate a DTE driving range for a known driving route of the vehicle. For example, the DTE driving range may be calculated by the DTE prediction tool based on a known vehicle driving route including at least one road segment, an energy consumption estimate for the road segment, an available battery charge, and stored energy consumption data from previous drive cycles. The controller may further be configured to control the presentation of the DTE driving range on the display.

Referring now to FIG. 1, an exemplary embodiment of a vehicle 101 (e.g., BEV) that will be referenced throughout this disclosure is illustrated in schematic form. The vehicle 101 includes a battery 12 and electric machine 14. The battery 12 may be representative of one or more batteries that includes a 12 V battery for powering one or more non-propulsion vehicle components (e.g., lighting, HVAC, displays, audio systems, infotainment systems, etc.) as well as one or more propulsion providing batteries. The vehicle 101 also includes a transmission 16, wheels 18, a computing system 20 that may be comprised of one or more processors and one or more memory units, an electrical port 22, and a display/interface 24. The computing system may be configured to run, in whole or at least in part, the DTE prediction tool described herein. The display/interface 24 may include a screen, speakers, a push button, or various other user interface elements. The electric machine 14 and wheels 18 are mechanically connected with the transmission 16 in any suitable/known fashion such that the electric machine 14 may drive the wheels 18, and the wheels 18 may drive the electric machine 14. Other arrangements that may include different configurations and/or more or less components are also possible. The battery 12 may provide energy to or receive energy from the electric machine 14. The battery 12 may also receive energy from a utility grid or other off-board power source (not shown) via the electrical port 22. The computing system 20 is in communication with and/or controls the battery 12, electric machine 14, transmission 16 and display/interface 24.

Although the present description references a BEV type of vehicle, it is within the scope of the present disclosure to apply the DTE prediction tool to other types of vehicles such as hybrid electric vehicles (HEV), and conventional vehicles powered by an internal combustion engine.

In a vehicle, whether a battery electric vehicle (BEV), hybrid electric vehicle (HEV), or conventional vehicle powered solely by an internal combustion engine, the energy consumption rate is monitored and learned for a variety of end use features. Various examples include an instantaneous energy consumption rate display, an average consumption rate over the trip odometer, a running global average consumption rate for the current drive cycle, and a distance to empty calculation. As a general concern it is important for such calculations to be accurate.

The predicted energy consumption rate and the energy consumption estimates referenced herein for calculating the DTE driving range prediction may correspond to average energy consumptions for operating the vehicle's propulsion system, and/or to average energy consumptions for operating one or more non-propulsion vehicle systems and/or vehicle components.

It should be noted that for conventional petroleum based combustion engine types of vehicles, the predicted energy consumption rate and/or energy consumption estimate may be generated by the DTE prediction tool in terms of an amount of petroleum fuel (e.g., gasoline, diesel fuel) predicted to be consumed in gallons, liters or other amount of measurable fuel usage, and/or in terms of an energy usage amount (e.g., kWh, Joules, or other similar unit of energy usage) by one or more vehicle batteries that are included in the vehicle system. For vehicles that rely, at least in part, on one or more batteries for powering the propulsion of the vehicle, the predicted energy consumption rate and/or energy consumption estimate may be generated by the DTE prediction tool in terms of amount of battery energy predicted to be consumed in terms of an energy usage amount (e.g., kWh, Joules, or other similar unit of energy usage) by one or more vehicle batteries that are included in the vehicle system. For alternative fuel based vehicles (e.g., biodiesel, solar power, liquefied petroleum gas, compressed natural gas, neat ethanol, fuel cells), the predicted energy consumption rate and/or energy consumption estimate may be generated by the DTE prediction tool in terms of an amount of the alternative fuel predicted to be consumed. It should be noted that it is within the scope of this disclosure to apply the features of the DTE prediction tool described herein to any one of the different types of vehicles running on the different energy sources described above, or other vehicle types running on an energy source to be utilized within the foreseeable future.

The DTE prediction tool may generate a DTE driving range prediction based on the summation of the predicted energy consumption rate for propulsive vehicle components and non-propulsive vehicle components. For example, the DTE prediction tool may identify a known vehicle driving route, partition the known vehicle driving route into one or more road segments, and determine an energy consumption estimate for each road segment based on a predicted energy consumption rate for each road segment. The DTE prediction tool may then compare an estimated vehicle battery energy availability against the predicted energy consumption rate in order to determine whether the vehicle battery energy availability is enough for the vehicle to traverse through the known vehicle driving route. The predicted energy consumption rates may be averaged energy consumption rates that have been recorded by the DTE prediction tool during previous operation and travels of the vehicle.

Figure 2:
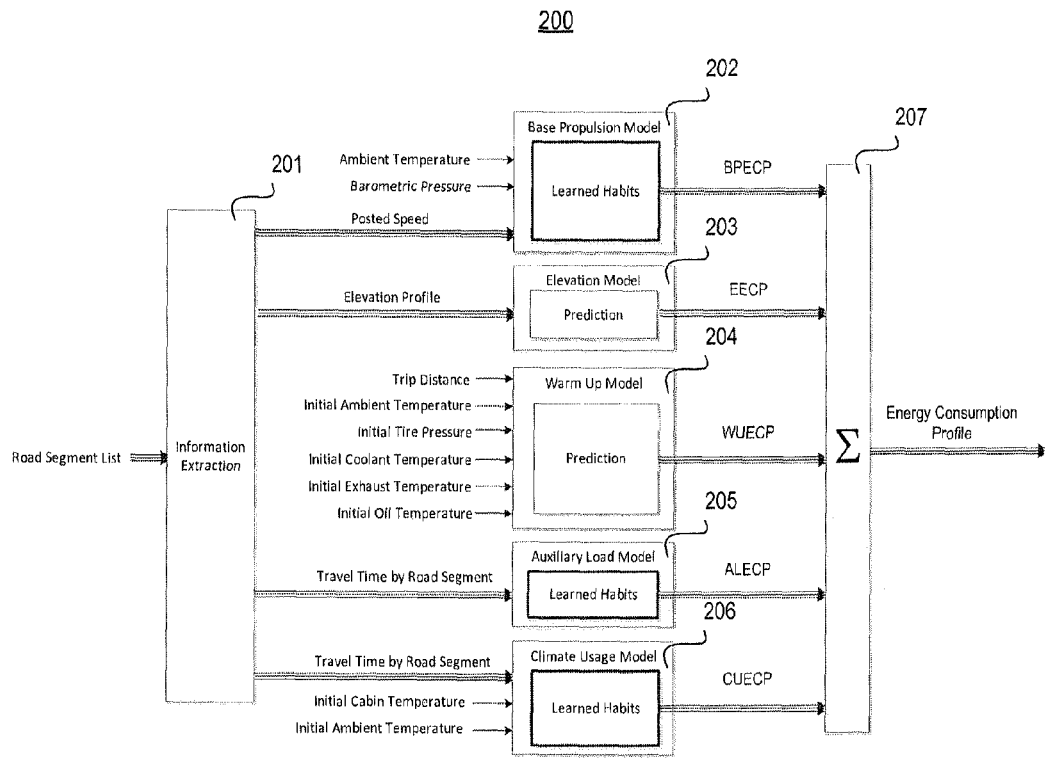
FIG. 2 illustrates an exemplary flow diagram describing a process for generating an energy consumption profile according to some embodiments.

For example, according to some embodiments, the DTE prediction tool may generate an energy consumption estimate for a particular road segment according to the process and components illustrated in FIG. 2. FIG. 2 illustrates a block diagram 200 that describes a process, and the information referenced throughout the process, for generating an energy consumption profile for a specified road segment, wherein the energy consumption profile corresponds to a total energy consumption estimate for a vehicle power supply (e.g., battery energy consumption for a HEV/PHEV or BEV, or fuel consumption for a combustion engine) that may be attributed to one or more known and/or predicted factors. Each of the potential factors that may attribute to the total energy consumption estimate for the vehicle, as represented by the energy consumption profile, is provided in more detail below with reference to the block diagram 200. Each of the components illustrated in FIG. 2 may represent software, hardware, middleware, or some combination thereof that may be included as part of the DTE prediction tool for generating the overall energy consumption profile for the vehicle 101.

At 201, the specified road segment may be identified from a list of one or more road segments that comprise a known driving route. Based on the road segment identified from the list, the DTE prediction tool may proceed to extract road segment information at 201. The road segment information may include, but is not limited to, posted speed limit on the identified road segment, an elevation profile for the identified road segment, current and/or predicted traffic information for the identified road segment, road condition information for the identified road segment, weather information for the identified road segment, or some other identifiable road segment attribute for the identified road segment. The road segment information may be considered external information accessed by the DTE prediction tool from a local database (e.g., database stored on a memory of the vehicle system), or accessed by the DTE prediction tool from an external source via communication through a network connection.

Figure 3:
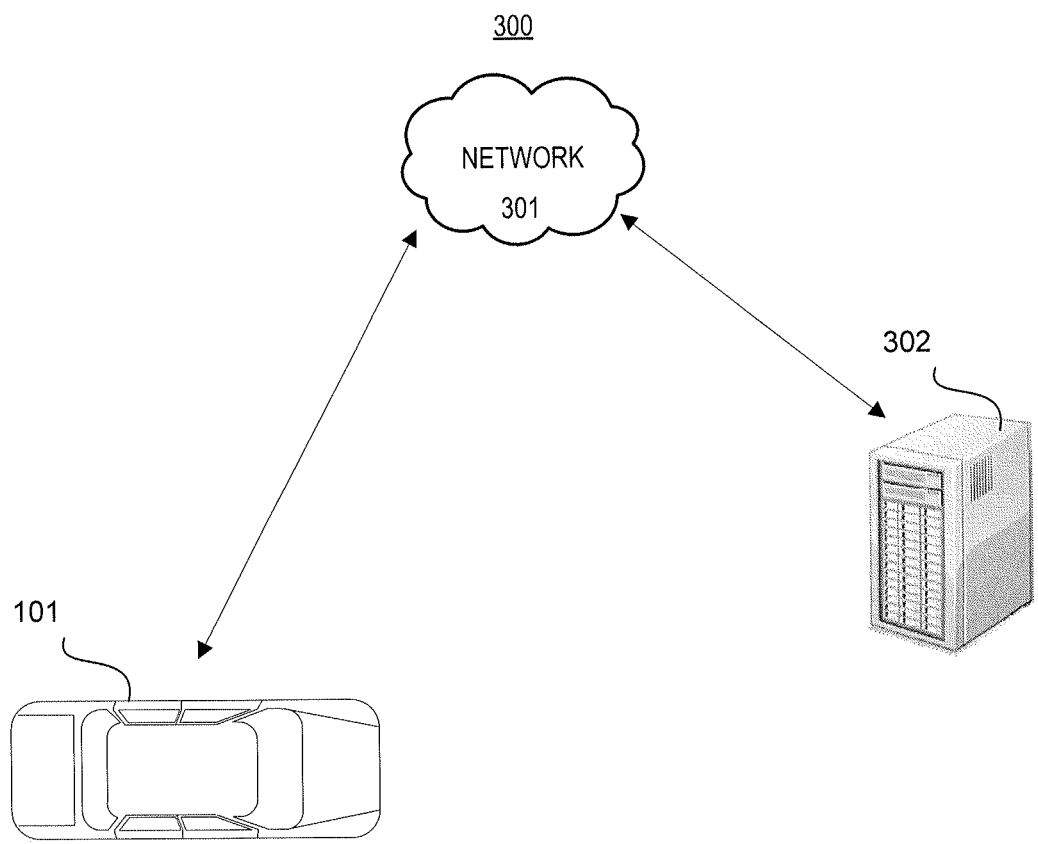
FIG. 3 illustrates an exemplary system for obtaining information according to some embodiments.

For embodiments where the road segment information is obtained from an external source, FIG. 3 illustrates an exemplary network system 300 comprised of the vehicle 101, a network 301, and an information server 302. The information server 302 may represent one or more external servers that store one or more of the road segment information described above. The DTE prediction tool may be running on the vehicle 101 such that the DTE prediction tool may control a communications interface of the vehicle system to communicate with the information server 302 via the network 301. The DTE prediction tool may control a request for the road segment information to be transmitted to the information server 302 via the network 301. In response, the information server 302 may receive the request and transmit, via the network 301, one or more of the requested road segment information back to the vehicle 101 to be received by the communications interface of the vehicle 101. Once the road segment information is received and stored on a storage unit (i.e., memory) of the vehicle system, the DTE prediction tool may then extract the road segment information, as illustrated at 201 in FIG. 2.

In addition, the DTE prediction tool may reference the road segment information to generate an estimated travel time for the vehicle 101 on the identified road segment. The estimated travel time may be generated by the DTE prediction tool based on an analysis of one or more of the information that comprises the road segment information. The estimated travel time may then be considered part of the extracted information at 201.

After extracting the road segment information at 201, the road segment information may be referenced by the DTE prediction tool to determine individual energy consumption models. In some embodiments, additional information may also be referenced by the DTE prediction tool in determining individual energy consumption models. Further description is provided below.

In terms of the individual models, a base propulsion model 202 may be utilized by the DTE prediction tool to generate a base propulsion energy consumption prediction that predicts an amount of energy that may be required to propel the vehicle 101 to traverse the identified road segment at the posted speed limit. The DTE prediction tool may determine the base propulsion energy consumption prediction based on, for example, the posted speed limit information included in the road segment information, as well as in some embodiments external information related to ambient temperature and barometric pressure. The external information may be obtained from vehicle sensors that are part of the vehicle system, or alternatively, the external information may be obtained from an information server 302 as described above with reference to the obtainment of the road segment information described herein.

The analysis of the posted speed limit information, ambient temperature information, and barometric pressure information may further be implemented by the DTE prediction tool in terms of learned habits of the vehicle 101. It follows that during the course of operation of the vehicle 101, the DTE prediction tool may record information that identifies an average energy consumption of the vehicle 101 when traveling in terms of one or more road segment attributes.

For example, the DTE prediction tool may record the average energy consumption of the vehicle 101 when the vehicle is traveling at a variety of different speeds, and/or traveling along certain road types. The DTE prediction tool may then store the average energy consumption information for the vehicle 101 as historical information within a database (e.g., stored on a memory storage unit) of the vehicle system such that the average energy consumption information may be accessed by the DTE prediction tool at a later time. Therefore, the database may include historical performance information for the vehicle 101 that describes the average energy consumption for the vehicle 101 at certain speeds, or ranges of speeds. The database may, for example, be configured to be a look-up table comprised of speeds, and/or ranges of speeds, matched up to their corresponding historical average energy consumptions for the vehicle 101. It follows that the DTE prediction tool may access this database in order to look up historical average energy consumptions for the vehicle 101 at particular speeds in order to use as the base propulsion energy consumption prediction in the base propulsion model 202.

In some embodiments, the DTE prediction tool may determine the base propulsion energy consumption prediction based on the historical information described above, and then further apply modifications to the base propulsion energy consumption prediction to account for the predicted effects of ambient temperature and barometric pressure on energy consumption. The modifications to the base propulsion energy consumption prediction obtained from the historical information database may be made in view of the specific ambient temperature information and barometric pressure information obtained by the base propulsion model 202.

After analyzing the information as described above, the DTE prediction tool may utilize the base propulsion model 202 to generate the based propulsion energy consumption prediction (BPECP) illustrated as resulting out of the base propulsion model 202. The BPECP generated for the specified road segment may be a product of a predicted energy consumption rate (e.g., average energy consumption rate from the database) and a travel length for the specified road segment.

The elevation model 203 is another exemplary model that may be utilized by the DTE prediction tool. Specifically, the elevation model 203 may be utilized by the DTE prediction tool to determine an elevation energy consumption prediction that predicts the potential energy consumed and gained by the vehicle 101 as the vehicle travels up and down different heights while traversing the identified road segment. The potential energy information as well as information identifying the elevation of the identified road segment may be received within an elevation profile from the extracted road segment information at 201. In some embodiments, the elevation energy consumption prediction may also take into consideration the effects of regenerative braking systems on the vehicle 101 that may be able to recoup some of the energy consumption. The DTE prediction tool may analyze the information included in the elevation profile, and in some embodiments the effects of regenerative braking, by plugging such information into a predetermined formula for generating the elevation energy consumption prediction. The predetermined formula may consider, for example, the mass of vehicle 101, acceleration due to gravity, and the elevation information for the identified road segment.

Based on the analysis of the elevation profile information, and in some embodiments the effects of regenerative braking, the DTE prediction tool may utilize the elevation model 203 to generate the elevation energy consumption prediction (EECP) illustrated as resulting out of the elevation model 203. The EECP generated for the specified road segment may be a product of a predicted energy consumption rate calculated according to the features described above in terms of the elevation profile information and a travel length for the specified road segment.

The warm up model 204 is another exemplary model that may be utilized by the DTE prediction tool. Specifically, the warm up model 204 may be utilized by the DTE prediction tool to determine a warm up energy consumption prediction that predicts the amount of energy consumed to start up the vehicle 101. For example, the warm up energy consumption prediction may correspond to a prediction of the additional energy consumed during the warm up period for the vehicle 101 due to factors including increased oil viscosity and catalyst light off. Some of the factors received by the warm up model 204 for determining the warm up energy consumption prediction may include, but not be limited to, trip distance information (i.e., road length information), initial ambient temperature information, initial tire pressure information, initial coolant temperature information, initial exhaust temperature information, and initial oil temperature information. The trip distance information corresponds to a distance traveled by the vehicle 101 since start up of the vehicle 101, wherein the trip distance information may, for example, be obtained via driver input or reference to a distance measuring component (e.g., odometer) of the vehicle system. The initial ambient temperature may, for example, be obtained from vehicle sensors included within the vehicle system, or alternatively, the initial ambient temperature may be obtained from an external information server 302, as described above. The initial tire pressure information may, for example, be obtained from one or more tire pressure monitors included within one or more of the wheels included in the vehicle system. The initial coolant temperature may, for example, be obtained from one or more temperature sensors included as part of the vehicle system. The initial exhaust temperature may, for example, be obtained from one or more temperature sensors included as part of the vehicle system. The initial oil temperature may, for example, be obtained from one or more temperature sensors included as part of the vehicle system.

By analyzing a combination of one or more of the input information received into the warm up model 204, the DTE prediction tool may utilize the warm up model 204 to generate the warm up energy consumption prediction (WUECP) illustrated as resulting out of the warm up model 204. The WUECP generated for the specified road segment may be a product of a predicted energy consumption rate calculated according to the features described above in terms of the warm up/trip information and a travel length for the specified road segment.

The auxiliary load model 205 is another exemplary model that may be utilized by the DTE prediction tool. Specifically, the auxiliary load model 205 may be utilized by the DTE prediction tool to determine an auxiliary energy consumption prediction that predicts an amount of energy required for the vehicle 101 to run various auxiliary loads during the course of traversing the identified road segment. The auxiliary loads may correspond to, but are not limited to, alternator loads or DC-to-DC converter loads resulting from headlights, interior lighting, audio system, infotainment system, speaker system, heated seats, solenoid valves, electric fans, vehicle control modules, sensors, climate blower fans, or other vehicle components that rely on a vehicle energy source (e.g., 12 Volt battery) to function. The auxiliary loads considered by the auxiliary load model 205 may correspond to one or more of the auxiliary loads the DTE prediction tool knows is currently running on the vehicle 101, one or more of the auxiliary loads the DTE prediction tool predicts will be running on the vehicle 101 during the course of traveling the identified road segment, or some combination of the two. The prediction of an auxiliary load may correspond to multiplying a distance or time the auxiliary load is predicted by the DTE prediction tool to be running during the course of the identified road segment, and a known average energy consumption for the auxiliary load.

The auxiliary load model 205 may further utilize learned habits of the vehicle 101 in determining the auxiliary energy consumption prediction. For example, during the course of operation of the vehicle 101, the DTE prediction tool may detect information identifying average energy consumption for powering one or more of the auxiliary loads described herein or otherwise known or capable of running on the vehicle 101. The DTE prediction tool may then store the average energy consumption rate information related to the powering of the auxiliary loads as historical information within a database (e.g., stored on a memory storage unit) of the vehicle system such that the average energy consumption information may be accessed by the DTE prediction tool at a later time. Therefore, such a database may include historical performance information for powering one or more of the vehicle components considered to be an auxiliary load on the vehicle 101. It follows that the DTE prediction tool may access this database in order to look up historical average energy consumptions for one or more auxiliary loads known or predicted by the auxiliary load model 205 to be running during the course of traveling the identified road segment.

As illustrated, the auxiliary load model 205 receives the estimated travel time on the identified road segment information from 201. By then multiplying the estimated travel time to each of the historical average energy consumptions for the one or more auxiliary loads known or predicted to be running on the vehicle 101 while traversing the identified road segment, the DTE prediction tool may obtain predicted energy consumption values for each of the auxiliary loads known or predicted to be running on the vehicle 101 while traversing the identified road segment. By summing each of these predicted energy consumption values, the DTE prediction tool may utilize the auxiliary load model 205 to generate the auxiliary load energy consumption prediction (ALECP) illustrated as resulting out of the auxiliary load model 205. It follows that the ALECP generated for the specified road segment may be a product of a predicted energy consumption rate calculated according to the features described above in terms of the auxiliary load information (e.g., average energy consumption rate stored in a database) and a travel length for the specified road segment.

The climate usage model 206 is another exemplary model that may be utilized by the DTE prediction tool. Specifically, the climate usage model 206 may be utilized by the DTE prediction tool to determine a climate usage energy consumption prediction for the vehicle 101 that relates to energy consumed by energy sources (e.g., battery or fuel) of the vehicle 101 to maintain climate control levels within the vehicle 101 while it traverses the identified road segment. For example, the climate usage model 206 may predict the amount of energy required to reach the vehicle cabin temperature set by a climate control system of the vehicle 101.

The climate usage model 206 may further utilize learned habits of the vehicle 101 in determining the climate usage energy consumption prediction. For example, during the course of operation of the vehicle 101, the DTE prediction tool may detect information identifying average energy consumption for powering the vehicle 101's climate control system in order to maintain the vehicle cabin at one or more set temperatures. In some embodiments, the DTE prediction tool may further take into account the outside temperature in comparison to the set vehicle cabin temperature when tracking the average energy consumption. The DTE prediction tool may then store the average energy consumption information related to the powering of the climate control system as historical information within a database (e.g., stored on a memory storage unit) of the vehicle system such that the average energy consumption information may be accessed by the DTE prediction tool at a later time. Therefore, such a database may include historical performance information for powering the climate control system at certain known set temperatures for maintaining the vehicle cabin. It follows that the DTE prediction tool may access this database in order to look up historical average energy consumptions for known set vehicle cabin temperatures.

In some embodiments, the DTE prediction tool may optionally consider whether one or more windows or sunroofs are in an up or down state to modify the historical average energy consumption information obtained from the database. For example, opened windows and/or sunroofs increase the predicted average energy consumption because the climate control systems may need to work harder to maintain the set vehicle cabin temperature.

As illustrated, the climate usage model 206 receives the estimated travel time on the identified road segment information from 201. By then multiplying the estimated travel time to the historical average energy consumption information obtained from the database described above, the DTE prediction tool may obtain the climate usage energy consumption prediction. As illustrated in FIG. 2, the climate usage model 206 may also receive initial cabin temperature information and initial ambient temperature information. The initial cabin temperature information and initial ambient temperature information may then be considered by the climate usage model 206 to modify the climate usage energy consumption prediction based on the historical average energy consumption information obtained from the database. For example, the further away the initial cabin temperature and/or the initial ambient temperature is from the vehicle cabin temperature currently set into the climate control system of the vehicle 101, the more predicted energy may be added by the DTE prediction tool to the energy consumption climate usage energy consumption prediction.

In some embodiments, the DTE prediction tool may optionally apply a saturation compensation to ensure the climate usage energy consumption prediction does not exceed a capability of the vehicle's climate control system.

In this way, the DTE prediction tool may utilize the climate usage model 206 to generate the climate usage energy consumption prediction (CUECP) illustrated as resulting out of the climate usage model 206. It follows that the CUECP generated for the specified road segment may be a product of a predicted energy consumption rate calculated according to the features described above in terms of the climate usage information (e.g., average energy consumption rate stored in a database) and a travel length for the specified road segment.

It should be noted that each of the energy consumption predictions (BPECP, EECP, WUECP, ALECP, CUECP) may have incorporated an effective energy conversion efficiency associated with converting the source energy (e.g., fuel energy or battery energy) in a usable form such as mechanical energy to propel the vehicle or the electrical energy for the vehicle's 12V battery to produce the energy to power one or more of the vehicle's auxiliary loads.

After generating the energy consumption predictions from one or more of the base propulsion model 202, elevation model 203, warm up model 204, auxiliary load model 205, and climate usage model 206, at 207 the DTE prediction tool may sum one or more (all in a preferred embodiment) of the generated energy consumption predictions to generate the energy consumption profile for the vehicle 101 traversing the identified road segment. The energy consumption profile may identify predicted energy consumption for the vehicle 101 as the vehicle 101 traverses the identified road segment based on the historical information, vehicle information, and external information described in detail above. The energy consumption profile may further be generated to be in the form of a predicted energy consumption rate for the specified road segment in terms of the various energy consumption predictions (BPECP, EECP, WUECP, ALECP, CUECP).

Figure 4:
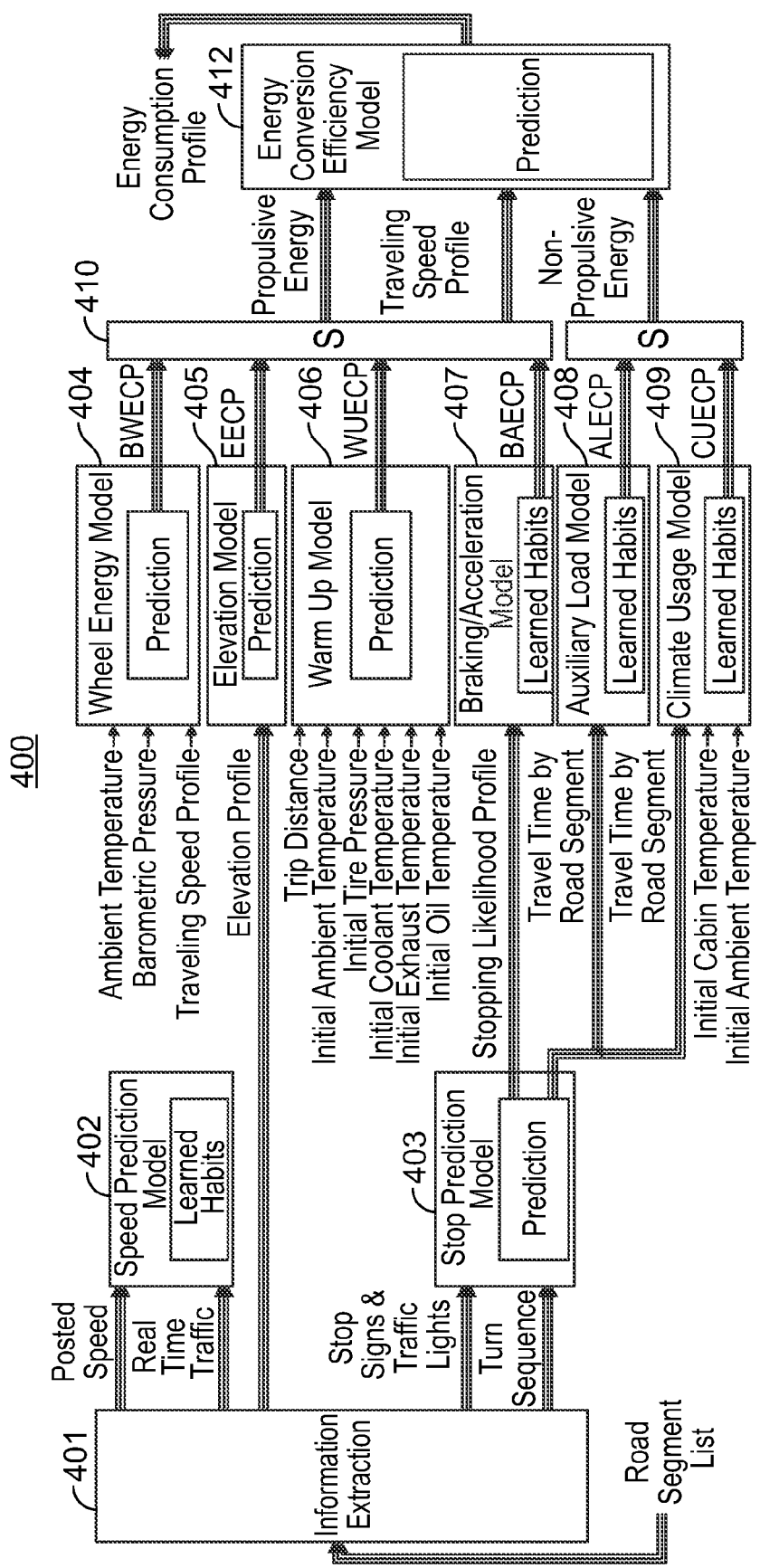
FIG. 4 illustrates an exemplary flow diagram describing a process for generating an energy consumption profile according to some embodiments.

In addition or alternatively, the DTE prediction tool may generate an energy consumption estimate for a particular road segment according to the process and components illustrated in FIG. 4. FIG. 4 illustrates a block diagram 400 that describes a process, and the information referenced throughout the process, for generating an energy consumption profile for a specified road segment, wherein the energy consumption profile corresponds to a total energy consumption estimate for a vehicle power supply (e.g., battery energy consumption for a HEV/PHEV or BEV, or fuel consumption for a combustion engine) that may be attributed to one or more factors. Each of the potential factors that may attribute to the total energy consumption estimate for the vehicle, as represented by the energy consumption profile, is provided in more detail below with reference to the block diagram 400. Each of the components illustrated in FIG. 4 may represent software, hardware, middleware, or some combination thereof that may be included as part of the DTE prediction tool for generating the overall energy consumption profile for the vehicle 101.

At 401, the specified road segment is identified from a list of one or more road segments that may comprise a known driving route. Based on the road segment identified from the list, the DTE prediction tool may proceed to extract road segment information at 401. The road segment information may include, but is not limited to, posted speed limit on the identified road segment, an elevation profile for the identified road segment, current and/or predicted traffic information for the identified road segment, road condition information for the identified road segment, weather information for the identified road segment, stop sign and traffic light information for the identified road segment, turn sequence information for the identified road segment, or some other identifiable road segment attribute for the identified road segment. The road segment information may be considered external information accessed by the DTE prediction tool from a local database (e.g., database stored on a memory of the vehicle system), or accessed by the DTE prediction tool from an external source via communication through a network connection.

For embodiments where the road segment information is obtained from an external source, FIG. 3 illustrates an exemplary network system 300 comprised of the vehicle 101, a network 301, and an information server 302. The information server 302 may represent one or more external servers that store one or more of the road segment information described above. The DTE prediction tool may be running on the vehicle 101 such that the DTE prediction tool may control a communications interface of the vehicle system to communicate with the information server 302 via the network 301. The DTE prediction tool may control a request for the road segment information to be transmitted to the information server 302 via the network 301. In response, the information server 302 may receive the request and transmit, via the network 301, one or more of the requested road segment information back to the vehicle 101 to be received by the communications interface of the vehicle 101. Once the road segment information is received and stored on a storage unit (i.e., memory) of the vehicle system, the DTE prediction tool may then extract the road segment information, as illustrated at 401 in FIG. 4.

In addition, the DTE prediction tool may reference the road segment information to generate an estimated travel time for the vehicle 101 on the identified road segment. The estimated travel time may be generated by the DTE prediction tool based on an analysis of one or more of the information that comprises the road segment information. The estimated travel time may then be considered part of the extracted information at 401.

After extracting the road segment information at 401, the road segment information may be referenced by the DTE prediction tool to determine individual energy consumption models. In some embodiments, additional information may also be referenced by the DTE prediction tool in determining individual energy consumption models. Further description is provided below.

In terms of the individual models, a speed prediction model 402 may be utilized by the DTE prediction tool to generate an estimated speed that is a prediction for a speed at which the vehicle 101 will travel along the identified road segment. The DTE prediction tool may determine the estimated speed for the vehicle 101 based on posted speed limit information and traffic information that may have been extracted as part of the road segment information at 401. For example, the DTE prediction tool may initially determine that a default speed for the vehicle 101 traveling along the identified road segment should equal the posted speed limit identified in the road segment information. The DTE prediction tool may then analyze the traffic information included in the road segment information to adjust the default speed for the vehicle 101 traveling along the identified road segment in view of the traffic information. For example, the traffic information may identify construction or rush hour traffic along the identified road segment, which would be analyzed by the DTE prediction tool to result in an average speed reduction from what was considered the default speed (e.g., posted speed limit). Therefore, based on this analysis the DTE prediction tool may determine the estimated speed for the vehicle 101 traveling along the identified road segment as the posted speed limit adjusted in view of the traffic information. The estimated speed may have a value that corresponds to an average constant speed for the vehicle 101 for a duration of traveling along the identified road segment.

Alternatively, in an embodiment based on learned habits, the DTE prediction tool may determine the estimated speed for the vehicle 101 based on traffic information and a historical speed at which the vehicle 101 has been driven when the speed limit is the speed limit identified in the road segment information. For example, the DTE prediction tool may initially determine a historical speed for the vehicle 101 traveling on a road having a posted speed limit the same as, or similar to, the posted speed limit identified in the road segment information (e.g., historically, the vehicle may be found to travel 40 m.p.h. on average in a 35 m.p.h. road segment). The historical speed information may, for example, be looked up from a historical database stored on a memory of the vehicle system. The historical database may be continually updated to determine the average speed for the vehicle 101 traveling along road segments having various posted speed limits by tracking the speed of the vehicle 101 as it travels along different road segments having known posted speed limits. After obtaining the historical speed, the DTE prediction tool may then analyze the traffic information included in the road segment information to adjust the historical speed determined for the vehicle 101 traveling along the identified road segment in view of the traffic information. For example, the traffic information may identify construction or rush hour traffic along the identified road segment, which would be analyzed by the DTE prediction tool to result in an average speed reduction from what was considered the historical speed. The traffic information may alternatively identify a lack of traffic along the identified road segment, which would be analyzed by the DTE prediction tool to result in an increase in average speed from what was considered the historical speed. In any case, based on this analysis the DTE prediction tool may then determine the estimated speed for the vehicle 101 traveling along the identified road segment as the historical speed adjusted in view of the traffic information. The estimated speed may have a value corresponding to an average constant speed for the vehicle 101 for a duration of traveling along the identified road segment.

In either embodiment, the estimated speed may be included in a traveling speed profile and transmitted from the speed prediction model 402 to the wheel energy model 404.

A stop prediction model 403 may be utilized by the DTE prediction tool to determine a stopping likelihood profile and a travel time estimate for the vehicle 101. The stopping likelihood profile may identify an estimated stopping duration time that the vehicle 101 is in a stopped state while traveling the identified road segment, and an estimated stopping probability for each traffic stop and/or stop sign identified in the road segment information for the identified road segment. For example, the DTE prediction tool may determine the estimated stopping probability as a probability the vehicle 101 will stop at each stopping point along the identified road segment (e.g., traffic light, pedestrian crossing, school crossing, stop sign, or other traffic point where the vehicle 101 may potentially be required to stop). The DTE prediction tool may determine the estimated stopped duration time as an estimated time the vehicle 101 may be in a stopped state at each of the stopping points along the identified road segment.

The DTE prediction tool may, for example, determine the estimated stopping probability at a stop sign to be 100%, while the estimated stopping probability for a traffic light may be based on whether the vehicle 101 is determined to be turning left, turning right, or continuing straight through the traffic light. The DTE prediction tool may, for example, determine the estimated stopping duration time for each stopping point to be based on the estimated stopping probability for the stopping point, and also based on whether the vehicle is determined to be turning left, turning right, or continuing straight through the stopping point based on the identified road segment and/or the overall selected route for the vehicle 101.

In this way, a final estimated stopping duration time may be calculated by the DTE prediction tool as the product of the estimated stopping duration time and the estimated stopping probability for each stopping point along the identified road segment. The final estimated stopping duration time may be included by the DTE prediction tool in order to generate the travel time estimate that is transmitted from the stop prediction model 403 to the auxiliary load model 408 and the climate usage model 409.

Further, the DTE prediction tool may generate the stopping likelihood profile to include any one or more of the estimated stopping duration time, estimated stopping probability, or the final estimated stopping duration time for each stopping point along the identified road segment. The stopping likelihood profile may be transmitted from the stop prediction model 403 to the auxiliary load model 408 and the climate usage model 409.

A wheel energy model 404 may be utilized, by the DTE prediction tool to generate a base wheel energy consumption prediction that predicts an amount of energy that may be required to propel the vehicle 101 to traverse the identified road segment at the estimated speed included in the traveling speed profile received from the speed prediction model 402. In determining the base wheel energy consumption prediction, the DTE prediction tool may further consider external information such as, for example, ambient temperature and barometric pressure. The external information may be obtained from vehicle sensors that are part of the vehicle system, or alternatively, the external information may be obtained from an information server 302 as described above with reference to the obtainment of the road segment information described herein.

In some embodiments as illustrated in FIG. 4, the DTE prediction tool may analyze one or more of the estimated speed information, ambient temperature information, and barometric pressure information in order to determine the base wheel energy consumption prediction. For example, any one or more of the estimated speed information, ambient temperature information, barometric pressure information, or other known information or other information derivable from the information described may be analyzed by the DTE prediction tool by being plugged into a predetermined formula for generating the base wheel energy consumption prediction. The predetermined formula may consider, for example, the mass of vehicle 101, identified road segment distance, estimated speed determined for the vehicle 101, air density, rolling resistance, and an aero dynamic drag coefficient in order to generate the base wheel energy consumption prediction.

Based on the analysis of the estimated speed information, ambient temperature information, and barometric pressure information as described above, the DTE prediction tool may utilize the wheel energy model 404 to generate the base wheel energy consumption prediction (BWECP) illustrated as resulting out of the wheel energy model 404. The BWECP generated for the specified road segment may be a product of a predicted energy consumption rate calculated in view of the base wheel information and a travel length for the specified road segment.

The elevation model 405 is another exemplary model that may be utilized by the DTE prediction tool. Specifically, the elevation model 405 may be utilized by the DTE prediction tool to determine an elevation energy consumption prediction that predicts the potential energy consumed and gained by the vehicle 101 as the vehicle travels up and down different heights while traversing the identified road segment. The potential energy information as well as information identifying the elevation of the identified road segment may be received within an elevation profile from the extracted road segment information at 401. In some embodiments, the elevation energy consumption prediction may also take into consideration the effects of regenerative braking systems on the vehicle 101 that may be able to recoup some of the energy consumption. The DTE prediction tool may analyze the information included in the elevation profile, and in some embodiments the effects of regenerative braking, by plugging such information into a predetermined formula for generating the elevation energy consumption prediction. The predetermined formula may consider, for example, the mass of vehicle 101, acceleration due to gravity, the elevation information for the identified road segment, and in some embodiments the effects of regenerative braking, to generate the elevation energy consumption prediction.

Based on the analysis of the elevation profile information, and in some embodiments the effects of regenerative braking, the DTE prediction tool may utilize the elevation model 405 to generate the elevation energy consumption prediction (EECP) illustrated as resulting out of the elevation model 405. The EECP generated for the specified road segment may be a product of a predicted energy consumption rate calculated according to the features described above in terms of the elevation profile information and a travel length for the specified road segment.

The warm up model 406 is another exemplary model that may be utilized by the DTE prediction tool. Specifically, the warm up model 406 may be utilized by the DTE prediction tool to determine a warm up energy consumption prediction that predicts the amount of energy consumed to start up the vehicle 101. For example, the warm up energy consumption prediction may correspond to a prediction of the additional energy consumed during the warm up period for the vehicle 101 due to factors including increased oil viscosity and catalyst light off. Some of the factors received by the warm up model 406 for determining the warm up energy consumption prediction may include, but not be limited to, trip distance information, initial ambient temperature information, initial tire pressure information, initial coolant temperature information, initial exhaust temperature information, and initial oil temperature information. The trip distance information corresponds to a distance traveled by the vehicle 101 since start up of the vehicle 101, wherein the trip distance information may, for example, be obtained via driver input or reference to a distance measuring component (e.g., odometer) of the vehicle system. The initial ambient temperature may, for example, be obtained from vehicle sensors included within the vehicle system, or alternatively, the initial ambient temperature may be obtained from an external information server 302, as described above. The initial tire pressure information may, for example, be obtained from one or more tire pressure monitors included within one or more of the wheels included in the vehicle system. The initial coolant temperature may, for example, be obtained from one or more temperature sensors included as part of the vehicle system. The initial exhaust temperature may, for example, be obtained from one or more temperature sensors included as part of the vehicle system. The initial oil temperature may, for example, be obtained from one or more temperature sensors included as part of the vehicle system.

By analyzing a combination of one or more of the input information received into the warm up model 406, the DTE prediction tool may utilize the warm up model 406 to generate the warm up energy consumption prediction (WUECP) illustrated as resulting out of the warm up model 406. The WUECP generated for the specified road segment may be a product of a predicted energy consumption rate calculated according to the features described above in terms of the warm up/trip information and a travel length for the specified road segment.

The braking/acceleration model 407 is another exemplary model that may be utilized by the DTE prediction tool. Specifically, the braking/acceleration model 407 may be utilized by the DTE prediction tool to determine a braking and accelerating energy consumption prediction for the vehicle 101 as the vehicle 101 travels along the identified road segment. As the vehicle 101 stops, or otherwise slows down, and then accelerates back to speed, energy is lost. In some embodiments where the vehicle 101 includes a regenerative braking system, some energy may be regained when the regenerative braking system is used during a braking operation. It follows that the braking/acceleration model 407 serves to predict an amount of energy that will be consumed due to the braking and accelerating of the vehicle 101 as it travels along the identified road segment. In order to generate the braking and accelerating energy consumption prediction, the braking/acceleration model 407 receives the stopping likelihood profile from the stop prediction model 403. The DTE prediction tool may analyze the information included in the stopping likelihood profile by plugging such information into a predetermined formula for generating the braking and accelerating energy consumption prediction. The predetermined formula may consider, for example, a regenerative braking efficiency, mass of the vehicle 101, estimated speed information as determined according to any one of the processes described herein, estimated stopping duration time information, energy consumption information for when the vehicle 101 is stopped or idling.

Based on the analysis of the stopping likelihood profile, the DTE prediction tool may utilize the braking/acceleration model 407 to generate the braking and acceleration energy consumption prediction (BAECP) illustrated as resulting out of the braking/acceleration model 407. The WUECP generated for the specified road segment may be a product of a predicted energy consumption rate calculated according to the features described above in terms of the braking/acceleration information and a travel length for the specified road segment.

The auxiliary load model 408 is another exemplary model that may be utilized by the DTE prediction tool. Specifically, the auxiliary load model 408 may be utilized by the DTE prediction tool to determine an auxiliary energy consumption prediction that predicts an amount of energy required for the vehicle 101 to run various auxiliary loads during the course of traversing the identified road segment. The auxiliary loads may correspond to, but are not limited to, alternator loads or DC-to-DC converter loads resulting from headlights, interior lighting, audio system, infotainment system, speaker system, heated seats, solenoid valves, electric fans, vehicle control modules, sensors, climate blower fans, or other vehicle components that rely on a vehicle energy source (e.g., 12 Volt battery) to function. The auxiliary loads considered by the auxiliary load model 408 may correspond to one or more of the auxiliary loads the DTE prediction tool knows is currently running on the vehicle 101, one or more of the auxiliary loads the DTE prediction tool predicts will be running on the vehicle 101 during the course of traveling the identified road segment, or some combination of the two. The prediction of an auxiliary load may correspond to multiplying a distance or time the auxiliary load is predicted by the DTE prediction tool to be running during the course of the identified road segment, and a known average energy consumption for the auxiliary load.

The auxiliary load model 408 may further utilize learned habits of the vehicle 101 in determining the auxiliary energy consumption prediction. For example, during the course of operation of the vehicle 101, the DTE prediction tool may detect information identifying average energy consumption for powering one or more of the auxiliary loads described herein or otherwise known or capable of running on the vehicle 101. The DTE prediction tool may then store the average energy consumption information related to the powering of the auxiliary loads as historical information within a database (e.g., stored on a memory storage unit) of the vehicle system such that the average energy consumption information may be accessed by the DTE prediction tool at a later time. Therefore, such a database may include historical performance information for powering one or more of the vehicle components considered to be an auxiliary load on the vehicle 101. It follows that the DTE prediction tool may access this database in order to look up historical average energy consumptions for one or more auxiliary loads known or predicted by the auxiliary load model 408 to be running during the course of traveling the identified road segment.

As illustrated, the auxiliary load model 408 receives the estimated travel time on the identified road segment information from 401. By then multiplying the estimated travel time to each of the historical average energy consumptions for the one or more auxiliary loads known or predicted to be running on the vehicle 101 while traversing the identified road segment, the DTE prediction tool may obtain predicted energy consumption values for each of the auxiliary loads known or predicted to be running on the vehicle 101 while traversing the identified road segment. By summing each of these predicted energy consumption values, the DTE prediction tool may utilize the auxiliary load model 408 to generate the auxiliary load energy consumption prediction (ALECP) illustrated as resulting out of the auxiliary load model 408. It follows that the ALECP generated for the specified road segment may be a product of a predicted energy consumption rate calculated according to the features described above in terms of the auxiliary load information (e.g., average energy consumption rate stored in a database) and a travel length for the specified road segment.

It should be noted that the BWECP, EECP WUECP and BAECP are energy consumption predictions that predict an amount of mechanical energy that may be required to propel the vehicle 101.

The climate usage model 409 is another exemplary model that may be utilized by the DTE prediction tool. Specifically, the climate usage model 409 may be utilized by the DTE prediction tool to determine a climate usage energy consumption prediction for the vehicle 101 that relates to energy consumed by energy sources (e.g., battery or fuel) of the vehicle 101 to maintain climate control levels within the vehicle 101 while it traverses the identified road segment. For example, the climate usage model 409 may predict the amount of energy required to reach the vehicle cabin temperature set by a climate control system of the vehicle 101.

The climate usage model 409 may further utilize learned habits of the vehicle 101 in determining the climate usage energy consumption prediction. For example, during the course of operation of the vehicle 101, the DTE prediction tool may detect information identifying average energy consumption for powering the vehicle 101's climate control system in order to maintain the vehicle cabin at one or more set temperatures. In some embodiments, the DTE prediction tool may further take into account the outside temperature in comparison to the set vehicle cabin temperature when tracking the average energy consumption. The DTE prediction tool may then store the average energy consumption information related to the powering of the climate control system as historical information within a database (e.g., stored on a memory storage unit) of the vehicle system such that the average energy consumption information may be accessed by the DTE prediction tool at a later time. Therefore, such a database may include historical performance information for powering the climate control system at certain known set temperatures for maintaining the vehicle cabin. It follows that the DTE prediction tool may access this database in order to look up historical average energy consumptions for known set vehicle cabin temperatures.

In some embodiments, the DTE prediction tool may optionally consider whether one or more windows or sunroofs are in an up or down state to modify the historical average energy consumption information obtained from the database. For example, opened windows and/or sunroofs increase the predicted average energy consumption because the climate control systems may need to work harder to maintain the set vehicle cabin temperature.

As illustrated, the climate usage model 409 receives the estimated travel time on the identified road segment information from 401. By then multiplying the estimated travel time to the historical average energy consumption information obtained from the database described above, the DTE prediction tool may obtain the climate usage energy consumption prediction. As illustrated in FIG. 4, the climate usage model 409 may also receive initial cabin temperature information and initial ambient temperature information. The initial cabin temperature information and initial ambient temperature information may then be considered by the climate usage model 409 to modify the climate usage energy consumption prediction based on the historical average energy consumption information obtained from the database. For example, the further away the initial cabin temperature and/or the initial ambient temperature is from the vehicle cabin temperature currently set into the climate control system of the vehicle 101, the more predicted energy may be added by the DTE prediction tool to the energy consumption climate usage energy consumption prediction.

In some embodiments, the DTE prediction tool may optionally apply a saturation compensation to ensure the climate usage energy consumption prediction does not exceed a capability of the vehicle's climate control system.

In this way, the DTE prediction tool may utilize the climate usage model 409 to generate the climate usage energy consumption prediction (CUECP) illustrated as resulting out of the climate usage model 409. It follows that the CUECP generated for the specified road segment may be a product of a predicted energy consumption rate calculated according to the features described above in terms of the auxiliary load information (e.g., average energy consumption rate stored in a database) and a travel length for the specified road segment.

It should be noted that the ALECP and CUECP are energy consumption predictions that predict an amount of energy for powering non-propulsive vehicle components and/or vehicle systems. The ALECP energy consumption prediction represents the amount of electric energy required to power the 12V battery system for the vehicle 101. The domain of the CUECP depends on the vehicle configuration. For electric vehicles with a high voltage electric A/C system or electric heating system, the CUECP estimate represents the amount of high voltage electric energy required to power the climate control systems. For a conventional vehicle, the cabin heating portion of the CUECP estimate represent the amount of heat energy extracted from the heat exchanger. On the other hand, the cabin cooling portion of the CUECP estimate represents the amount of mechanical energy required to operate the A/C compressor.

In general, each of the energy conversion efficiency models illustrated in FIG. 4 determines how much source energy (e.g. gallons of fuel or watt hours of battery energy) is requires to provide energy to all of the system components taking into account the various conversion efficiencies. To satisfy the 12V energy loads, a conventional vehicle must first convert fuel energy into mechanical energy via combustion and then convert mechanical energy into electric energy via an alternator.

After generating the energy consumption predictions from one or more of the wheel energy model 404, elevation model 405, warm up model 406, braking/acceleration model 407, auxiliary load model 408, and climate usage model 409, a summation function may be implemented by the DTE prediction tool at 410 and 411. For example, at 410 the DTE prediction tool may implement the summation of the energy consumption predictions from the wheel energy model 404, elevation model 405, warm up model 406, and braking/acceleration model 407 to generate a propulsive energy consumption prediction. Further, at 411 the DTE prediction tool may implement the summation of the auxiliary load model 408, and climate usage model 409 to generate a non-propulsive energy consumption prediction.

Then, the DTE prediction tool may utilize an energy conversion efficiency model 412 in order to generate the energy consumption profile. The energy conversion efficiency model 412 receives the propulsive energy consumption prediction, non-propulsive energy consumption prediction, and traveling speed profile as input information. The energy conversion efficiency model 412 then applies known energy conversion efficiencies for the vehicle 101's power plant that is providing the energy, in order to generate the final energy consumption profile. For example, the energy conversion efficiency may be a measurement of how much energy that is provided to a vehicle component for achieving a vehicle function will be ultimately utilized to achieve the intended vehicle function during an energy conversion process. In other words, the energy consumption efficiency may be a measurement of energy consumption and energy loss during an energy conversion process. In order to apply the known energy conversion efficiencies, an energy efficiency database may be stored on a memory of the vehicle system that plots known energy conversion efficiencies for the vehicle power plant (e.g., a vehicle battery used for propelling the vehicle 101 or powering components of the vehicle system when the vehicle 101 is an electric or hybrid vehicle) as a function of a vehicle's speed (e.g., estimated speed of the vehicle 101 travelling the identified road segment that is included in the traveling speed profile, or the vehicle 101's speed as detected by a current speed measuring component). It follows that a lower energy conversion efficiency for the vehicle power plant may result in the propulsive energy consumption prediction and non-propulsive energy consumption prediction being adjusted higher to generate the final energy consumption profile in order to make up for the lower energy conversion efficiency. The energy consumption profile may further be generated to be in the form of a predicted energy consumption rate for the specified road segment in terms of the various energy consumption predictions (BWECP, EECP, WUECP, BAECP, ALECP, CUECP).

It should be noted that the average energy consumption values described above based on the historical information may be average steady state energy consumption rate values. Further, the vehicle 101 may come preloaded with some baseline energy consumption estimates based on testing scenarios for a test vehicle that is the same, or at least similar, vehicle model as vehicle 101. The testing scenarios may correspond to detecting the energy consumption for the test vehicle under a variety of energy consuming operations such as driving the test vehicle at various speeds, driving the test vehicle under various loads, driving the test vehicle under various initial conditions, and driving the test vehicle under various external conditions. Some examples for the different scenarios for operating the vehicle are provided throughout this disclosure, however other scenarios are also within the scope of the innovation described herein. Then based on the different testing scenarios, energy consumption predictions may be obtained for the test vehicle operating under the various scenarios. The energy consumption predictions may then be stored as part of a database that may be preloaded onto a memory that is part of the vehicle system. It follows that this preloaded database may be referenced, analyzed, and utilized when generating the energy consumption profile according to any one or more of the processes described herein.

Although the above description was provided in terms of a road segment that is part of an overall known driving route, it is also within the scope of the present disclosure for the DTE prediction tool to provide an energy consumption profile for any identifiable road segment. In other words, the DTE prediction tool may provide an energy consumption profile for a road segment having known road segment attributes as described herein.

It follows that for a known vehicle driving route, a predicted energy consumption rate and/or energy consumption estimate may be generated by the DTE prediction tool according to any one or more of the processes described above with reference to FIG. 2 and FIG. 4.

As described previously, it is especially important for the BEV type of vehicle to accurately calculate the vehicle range or distance to empty ("DTE"). BEVs generally have shorter range than conventional vehicles, and as such BEV operators are highly reliant on the vehicle range calculation to ensure that the destination is within the vehicle's driving range.

Figure 5:
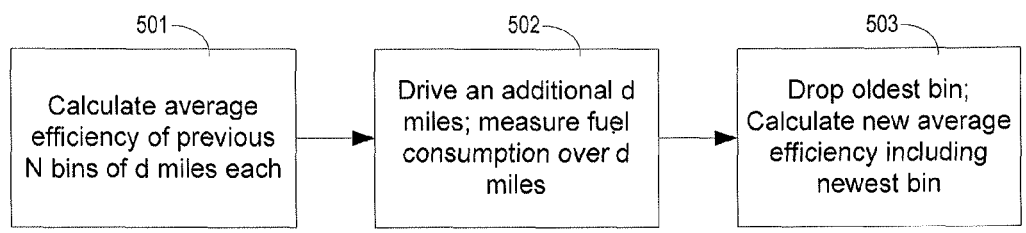
FIG. 5 illustrates an exemplary flow chart describing a process according to some embodiments.

In a conventional vehicle, vehicle driving range is generally calculated based on stored bins of historical vehicle driving range, each bin being individually calculated based on fuel consumption over a fixed distance, to produce an average vehicle driving range. For example, FIG. 5 illustrates an exemplary process the DTE prediction tool may implement for calculating the vehicle driving range. An average efficiency is calculated based on a previous N number of bins, as illustrated at block 501. Each of the bins $b_1, b_2 \ldots b_N$ includes a fuel consumption or fuel efficiency value for a vehicle driving interval of d miles. As an example, N may be 6, and d may be 60. In such an example, the efficiency would thus be averaged over a total of 360 miles driven. The vehicle subsequently drives an additional d miles, as illustrated at block 502. The fuel consumed over the d miles is measured, and a fuel efficiency is calculated for the new bin $b_{N+1}$. The oldest bin is then dropped, as illustrated at block 503. A new efficiency is then calculated using an average of $b_2, b_3 \ldots b_{N+1}$.

This technique, however, may be less accurate during transient driving events, such as a transition from city to highway driving. This method also provides a discontinuous estimate that may result in a large step change when dropping the oldest stored bin. Additionally, conventional range calculations generally assume that the available energy from remaining fuel is a constant, regardless of temperature or age. However, the energy available from a BEV battery for a given state of charge may vary based on battery temperature and age. Furthermore, cabin heating and cooling generally have more substantial and variable impacts on energy consumption in a BEV than they do in a conventional vehicle. In extreme circumstances, such as in cold parts of winter, the combined vehicle energy usage may double relative to normal operation due to cabin heating energy usage.

Figure 6:
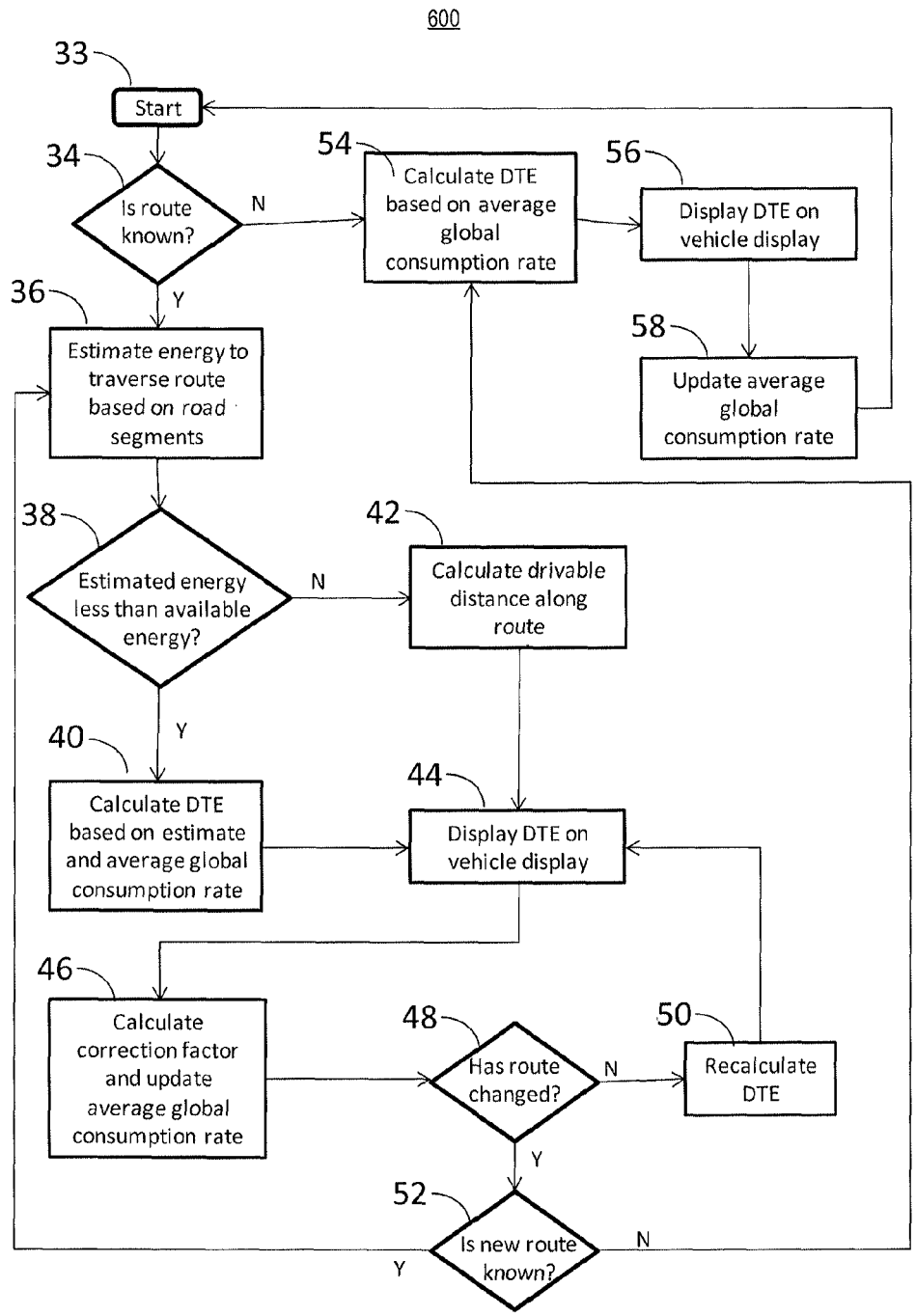
FIG. 6 illustrates an exemplary flow chart describing a process according to some embodiments.

Referring now to FIG. 6, FIG. 6 illustrates a flowchart 600 that describes a preferred method for calculating a vehicle driving range. The method described by flowchart 600 may be controlled by the DTE prediction tool in order to generate a DTE prediction for a known driving route, and an ongoing DTE prediction when the driving route (e.g., final destination) is not known.

The method described by flowchart 600 begins at 33. Then at 34, the DTE prediction tool determines whether a driving route for the vehicle's current driving cycle is known. In some embodiments, this determination may be made based on a driver-input destination in a vehicle navigation system or a portable navigation device in communication with the vehicle. In other embodiments, a vehicle display may be provided with a number of destination selectors for "home", "work", and/or other frequent destinations.

If the vehicle driving route is known, then an energy consumption estimate is determined based upon a predicted energy consumption estimate for at least one road segment that comprises the known driving route, as illustrated at block 36. The energy consumption estimate for a road segment that comprises the known driving route may be generated by the DTE prediction tool according to any one or more of the methods described herein, with particular reference to the methods described with reference to FIG. 2 and FIG. 4. Other known methods of calculating energy usage for a given route segment may also be used.

In one embodiment, the road segments may be based upon a fixed distance. As examples of such an embodiment, the known driving route may be broken into segments of five miles, ten miles, or some other appropriately identifiable distance. In another embodiment, the road segments may be calculated to be a percentage of the over known driving route. As a nonlimiting example of such an embodiment, the known driving route may be broken into five road segments, each comprising 20% of the known driving route. In a further embodiment, the road segments may be based on attributes of the roads on the known driving route. As a nonlimiting example, the known driving route may be broken into a highway road segment and a surface street road segment.

The energy usage for the route may then be calculated according to the equation:

$$E_{route\_total} = E_{road\_seg1} + E_{road\_seg2} + E_{road\_seg3} + E_{road\_seg4},$$

where $E_{route\_total}$ is a total energy consumption estimate for the known driving route in Whr (Watt hours), $E_{road\_seg1}$ is an energy consumption estimate for a first road segment in Whr, $E_{road\_seg2}$ is an energy consumption estimate for a second road segment in Whr, $E_{road\_seg3}$ is an energy consumption estimate for a third road segment in Whr, and $E_{route\_seg4}$ is an energy consumption estimate for a fourth road segment in Whr. Although four road segments are used in this illustrative example, more or fewer road segments may be used.

After calculating a total energy consumption estimate for the known driving route, the DTE prediction tool may make a determination as to whether the energy consumption estimate is less than an available energy, as illustrated at operation 38. The available energy may be a stored battery energy measurement value obtained from a vehicle computing system.

If yes, than the vehicle DTE is calculated based on the energy consumption estimate and a stored average consumption rate, as illustrated at block 40. The DTE calculation may be performed using the equation:

$$DTE_{nom} = D_{trip} + \frac{(E_{batt} - E_{trip\_total})}{R_{global,whr/km}},$$

where $DTE_{nom}$ is a nominal distance to empty, $D_{trip}$ is a total trip distance of the route in km, $E_{batt}$ is an available energy in Whr, and $R_{global,whr/km}$ is a the stored average global energy consumption rate in Whr/km. The average global energy consumption rate may be an average energy consumption rate calculated for the vehicle by, for example, the DTE prediction tool over the course of the vehicle's lifetime, or current drive cycle. The current drive cycle may be reset by a passenger of the vehicle, so that the global energy consumption rate may be reset simultaneously in order to allow a new global energy consumption rate to be calculated. The average energy consumption rate may be a combination of one or more of average energy consumption rates for propulsive and non-propulsive vehicle components that required energy from the one or more vehicle batteries.

Thus, when the available energy for the vehicle battery exceeds that required for the current vehicle route, the excess energy is presumed to be consumed in future trips consistent with the average global energy consumption rate.

If the energy consumption estimate for the known driving route is not less than the available energy, then a drivable distance along the known driving route is calculated, as illustrated at block 42. The drivable distance calculation may be performed using the equations:

$$DTE_{nom} = \frac{E_{batt}}{E_{road\_seg\_1}} D_{road\_seg\_1} \text{ if } E_{batt} \leq E_{road\_seg\_1};$$

$$DTE_{nom} = D_{road\_seg\_1} + \frac{E_{batt} - E_{road\_seg\_1}}{E_{road\_seg\_2}} D_{road\_seg\_2}$$

if $0 < E_{batt} - E_{road\_seg\_1} \leq E_{road\_seg\_2};$ $$DTE_{nom} = D_{road\_seg\_1} + D_{road\_seg\_2} + \frac{E_{batt} - E_{road\_seg\_1} - E_{road\_seg\_2}}{E_{road\_seg\_3}} D_{road\_seg\_3}$$

if $0 < E_{batt} - E_{road\_seg\_1} - E_{road\_seg\_2} \leq E_{road\_seg\_3};$ etc., where $D_{road\_seg1}$ is a trip distance for a first road segment in Km, $D_{road\_seg2}$ is a trip distance for a second road segment in Km, and $D_{road\_seg3}$ is a trip distance for a third road segment in Km. Thus, when the available energy is insufficient to complete the current vehicle driving route, the DTE is based on a determination of how many of the road segments may be fully traversed along with a fractional distance along the subsequent road segment.

Following the DTE calculation of either block 40 or block 42, the DTE is displayed to a vehicle operator on the vehicle display, as illustrated at block 44. A correction factor is then calculated, and the global average consumption rate is updated in accordance with the correction factor, as illustrated at block 46.

Figure 7:
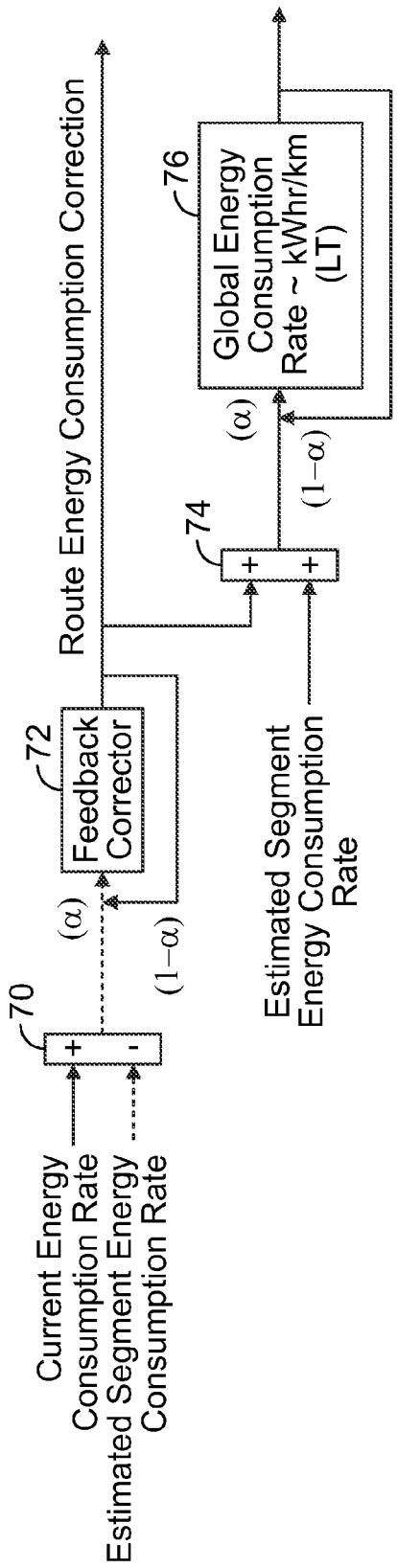
FIG. 7 illustrates an exemplary block diagram for a method of calculating a consumption rate correction rate according to some embodiments.

According to some embodiments, the DTE prediction tool may calculate the correction factor and average global consumption rate using the methods illustrated in block diagram form in FIG. 7. A difference is calculated between a current energy consumption rate and the estimated energy consumption rate for the current route segment, as illustrated at block 70. A correction factor is calculated based on the difference, as illustrated at block 72.

The correction factor may be calculated as a feedback corrector using a discrete first order filter according to the equation:

$$R_{route\_corr,whr/km}(k) = [1-\alpha]R_{route\_corr,whr/km}(k-1) + \alpha\left[R_{whr/km}(k) - \frac{E_{road\_seg\_x}}{D_{road\_seg\_x}}\right],$$

where $R_{route\_corr,whr/km}$ is the route energy consumption rate correction factor in Whr/km, k is a discrete time index, $\alpha$ is a filter constant, $E_{road\_seq\_x}$ is an energy consumption estimate for the current road segment in Whr, $D_{road\_seq\_x}$ is a distance of the current road segment in Whr, and $R_{whr/km}$ is a current observed energy consumption rate in Whr/km.

A sum of the correction factor and the estimated energy consumption rate for the current route segment is calculated, as illustrated at block 74. The global energy consumption rate may be calculated using a discrete first order filter according to the equation:

$$R_{global,whr/km}(k) = [1-\alpha]R_{global,whr/km}(k-1) + \alpha\left[R_{whr/km}(k) - \frac{E_{road\_seg\_x}}{D_{road\_seg\_x}} + R_{global,whr/km}(k-1)\right],$$

When the nominal DTE is first calculated for a given drive cycle, the correction factor should be reset, i.e. set equal to zero. As may be seen from the above, the observed energy consumption rate is compared to the estimated average energy consumption rate of the current route segment as the route is traversed. The correction factor is learned based on the difference between the estimated and observed values using a first order filter, and the global energy consumption rate learns the correction factor at the same rate.

Returning to FIG. 6, after the correction factor and global average consumption rate are updated, a determination is made of whether the route has changed, as illustrated at operation 48. The presence of a route change may be determined in response to a new user-designated location on a navigation system or other input device, or inferred in response to a detected vehicle location diverging from the known vehicle route. A route change may also be inferred if the vehicle reaches the end of the known vehicle route and continues driving.

If the route has not changed, then the DTE is recalculated as illustrated at block 50. This recalculation may be performed according to the equation:

$$DTE(k) = DTE_{nom} - D_{traveled}(k) - \left(\frac{E_{batt}(k)}{R_{global,whr/km}(k)} - \frac{E_{batt}(k)}{R_{global,whr/km}(k) + R_{route\_corr,whr/km}(k)}\right),$$

where $D_{traveled}$ is a distance traveled along the route in km, miles, or another identifiable measurement of distance. As may be seen, while the vehicle is traversing a known route, the route energy consumption correction factor is applied to the remaining battery energy available. In some embodiments, the correction is applied to both the known route portion of the DTE estimate and the remaining portion, as the global energy consumption rate learns the same correction at the same rate. After recalculating DTE, control returns to block 44.

If the route has changed, then a determination is made of whether the new driving route is known. If the new driving route is known, then control returns to block 36. If the new driving route is not known, then the DTE is calculated based on the stored global average consumption rate, as illustrated at block 54. Notably, this calculation is also performed if a determination is made that the route is not known at operation 34. The DTE calculation for an unknown route may be performed according to the equation:

$$DTE(k) = \frac{E_{batt}(k)}{R_{global,whr/km}(k)}$$

The calculated DTE is displayed on the vehicle display, as illustrated at block 56. The average global consumption rate is then updated, as illustrated at block 58. The global energy consumption rate may be updated according to the equation:

$$R_{global,whr/km}(k) = [1-\alpha]R_{global,whr/km}(k-1) + [\alpha]R_{whr/km}(k),$$

where $R_{global,whr/km}$ is the global energy consumption rate in Whr and $R_{whr/km}$ is the current observed energy consumption rate. As may be seen, when the current route is unknown, the observed energy consumption rate is used to update global energy consumption rate. In this embodiment, the global energy consumption rate is shown as a single factor. However, in some embodiments the global energy consumption rate is broken down into individual factors such as propulsive energy, losses and climate control. These factors may be learned individually and summed to produce the global energy consumption rate.

As may be seen, as a vehicle traveling along a known route nears the end of the known route, the calculation of block 40 converges with that of block 54. The range calculation thus smoothly transitions from one based partially on a known vehicle route to one based on a stored average fuel consumption rate.

Figure 8:
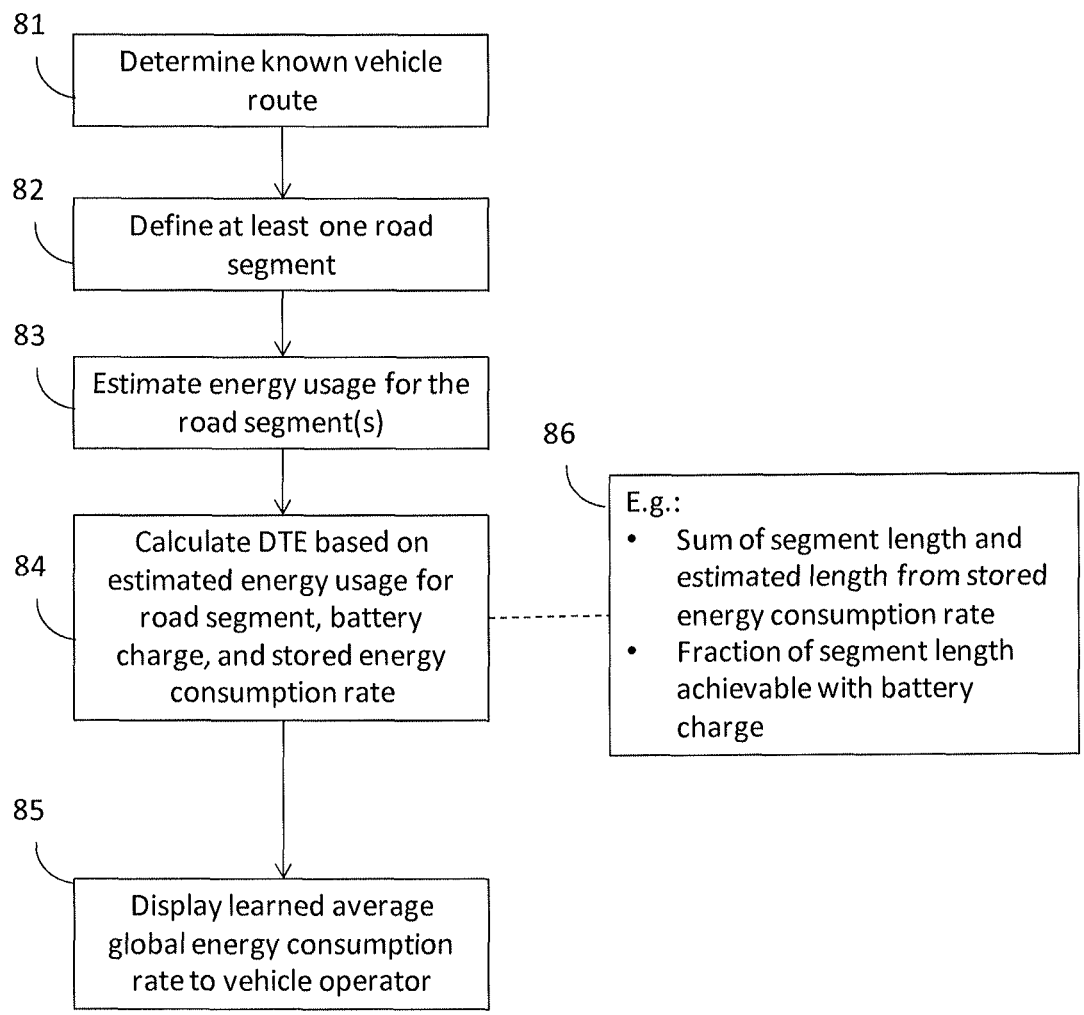
FIG. 8 illustrates an exemplary flow chart describing a process according to some embodiments.

Referring now to FIG. 8, a flowchart 800 is illustrated that describes a method for controlling a vehicle according to the present disclosure. The method described by flowchart 800 may be, for example, controlled by the DTE prediction tool described herein.

At 81, a known vehicle route may be determined. The known vehicle route may be determined according to any one or more of the methods described herein.

At 82, the known vehicle route is partitioned into one or more road segments, in accordance to any one or more of the methods described herein.

At 83, the energy usage for the road segments may be estimated, wherein the energy consumption estimates may be generated according to any one or more method described herein for generating an energy consumption estimate for a known road segment.

At 84, the distance to empty may be calculated based on the energy consumption estimates generated at 83, a current battery charge, and a stored energy consumption rate, as illustrated in block 76. As examples, this may include a sum of a road segment length and an estimated length based on the stored energy consumption rate, or a fraction of a segment length achievable based on the battery charge, as illustrated in block 86.

At 85, the DTE may then be provided to a vehicle passenger by displaying the DTE information to an in-cabin display.

While the above method has been described largely with respect to BEVs, embodiments according to the present disclosure may also be used in conjunction with HEVs, plug-in hybrid electric vehicles (PHEVs), and conventional vehicles.

As can be seen from the various embodiments, the present invention provides a method of calculating a vehicle range that is accurate and dynamically compensates for changes in driving style. Furthermore, the present invention provides a method of calculating range that is continuous, rather than known discontinuous methods.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

Figure 9:
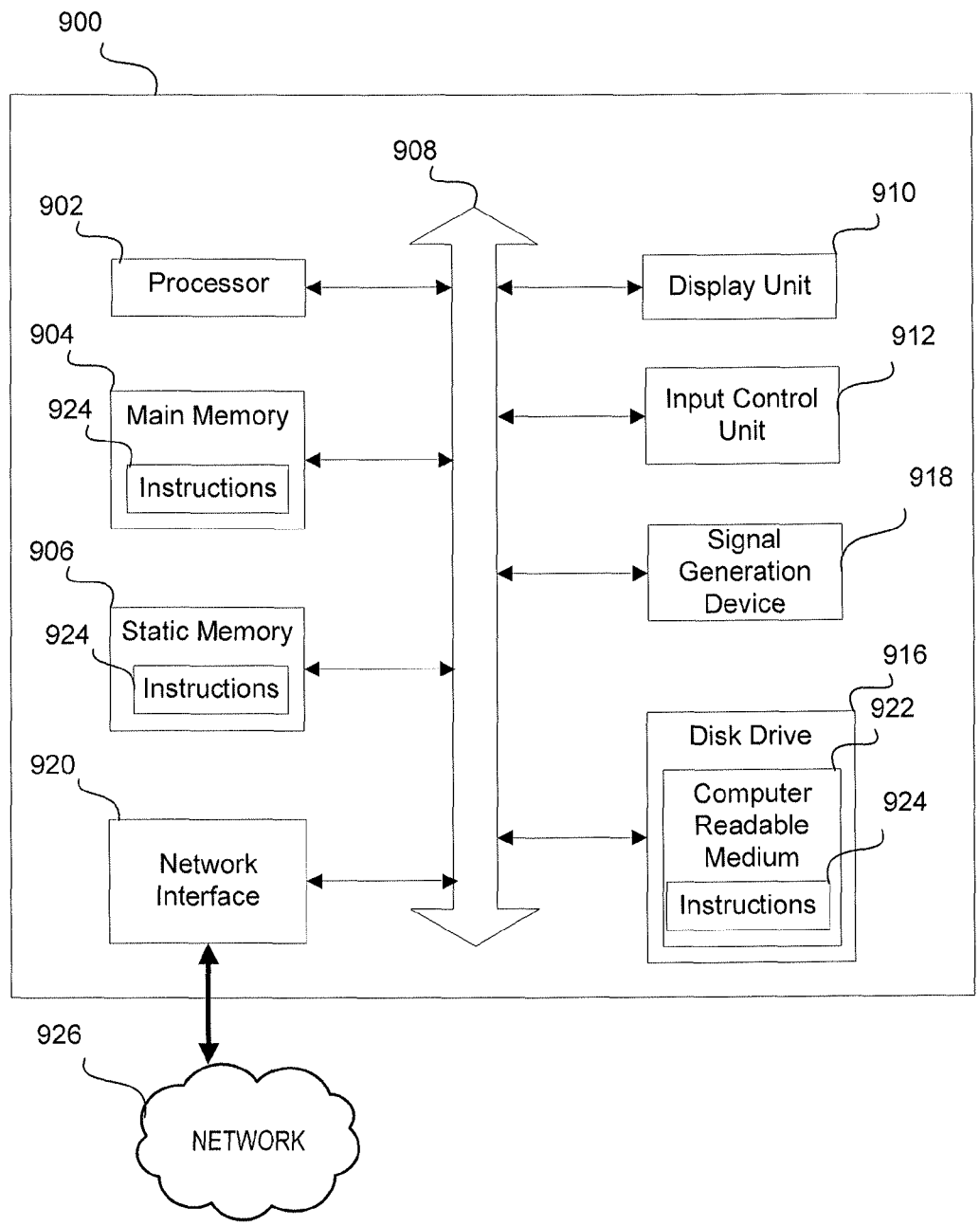
FIG. 9 illustrates an exemplary block diagram for a computing system that may be part of a vehicle system according to some embodiments.

FIG. 9 includes an illustrative embodiment of a computing system 900 configured to be included in a vehicle system as described throughout this disclosure. For example, the computing system 900 may correspond to the computing system 20 described with reference to FIG. 1.

The computing system 900 can include a set of instructions that may be executed to cause the computing system 900 to perform any one or more of the methods, processes or computer-based functions disclosed herein. For example, the DTE prediction tool may be a program that is comprised of a set of instructions 924 that are executed to cause the computing system 900 to perform any one or more of the methods, processes or computer-based functions described herein. The instructions may be stored in any one or more of the main memory 904, static memory 906, or disk drive 916. The computing system 900 may be connected, using a network 926, to other computer systems or peripheral devices. The computing system 900 connected to the network 926 can communicate voice, video or data over the network 926 to another computing system or device via the network interface 920. The computing system 900 connected to the network 926 can also receive voice, video or data over the network 926 from another computer system or device via the network interface 920. For example, the instructions 924 may be transmitted or received over the network 926 via the network interface 920.

The network 926 may correspond to the network 301 described in FIG. 3. The network 926 may be a collection of one or more networks, including standards-based networks (e.g., 2G, 3G, 4G, Universal Mobile Telecommunications System (UMTS), GSM® Association, Long Term Evolution (LTE)™, or more), WiMAX, Bluetooth, near field communication (NFC), WiFi (including 802.11 a/b/g/n/ac or others), WiGig, Global Positioning System (GPS) networks, and others available at the time of the filing of this application or that may be developed in the future. Further, the network 926 may be a public network, such as the Internet, a private network, such as an intranet, or combinations thereof, and may utilize a variety of networking protocols now available or later developed including, but not limited to TCP/IP based networking protocols.

While a single computing system 900 is illustrated, the term "system" shall also be taken to include any collection of systems or sub-systems that individually or jointly execute a set, or multiple sets, of instructions to perform one or more computer functions and features described herein. If follows that a vehicle configured to implement the features described in this disclosure may include a computing system that include more, or less, components as described by the computing system 900 illustrated in FIG. 9.

As illustrated in FIG. 9, the computing system 900 may include a processor 902, such as a central processing unit ("CPU"), a graphics processing unit ("GPU"), or both. Moreover, the computing system 900 may include any combination of a main memory 904 and a static memory 906 that can communicate with each other via a communication bus 908. As shown, the computing system 900 may further include a video display unit 910, such as a liquid crystal display ("LCD"), an organic light emitting diode ("OLED"), a flat panel display, a solid state display, or a cathode ray tube ("CRT"). The display unit 910 may be representative of one or more displays available within the vehicle cabin (e.g., navigation display, heads up display, pop up display, infotainment display, etc.). Additionally, the computing system 900 may include an input control unit 912 that includes one or more input devices such as a keyboard, scanner, digital camera for image capture and/or visual command recognition, touch screen, motion sensor, audio input device, or a cursor control device (e.g., mouse or touchpad) for receiving a passenger's input commands. The computing system 900 can also include a disk drive 916 for receiving a computer-readable medium 922. The computing system 900 may also include a signal generation device 918 (e.g., a speaker system or remote control signal output system), and a network interface 920.

In some embodiments, as depicted in FIG. 9, the disk drive 916 may receive the computer-readable medium 922 in which one or more sets of instructions 924, such as software, can be embedded. Further, the instructions 924 may embody one or more of the methods, processes, or logic as described herein such as the DTE prediction tool. In some embodiments, the instructions 924 may reside completely, or at least partially, within the main memory 904, the static memory 906, and/or within the processor 902 during execution of the instructions 924 by the computing system 900. The main memory 904 and the processor 902 also may include computer-readable media.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium 922 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or mere of the methods or operations disclosed herein.

In some embodiments, the computer-readable medium 922 can include a solid-state memory such as a memory card or other package that houses one or more non-volatile read-only memories, such as flash memory. Further, the computer-readable medium 922 can be a random access memory or other volatile re-writable memory. Additionally, the computer-readable medium 922 can include a magneto-optical or optical medium, such as a disk or tapes or other storage device to capture information communicated over a transmission medium. A digital file or digital information that is transmitted or received over the network 926 may be considered a distribution medium that is equivalent to a tangible storage medium. Accordingly, the disclosure is considered to include any one or more of a computer-readable medium or a distribution medium and other equivalents and successor media, in which data or instructions may be stored.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle comprising:
a battery that drives wheels via a motor;
a processor configured to:
break a received route into a plurality of segments;
calculate a route energy consumption rate correction factor (RECF) for a current segment as a function of the following received values: a RECF of the previous segment, an observed energy consumption rate, an energy consumption estimate for the current segment, and a distance of the current segment.

2. The vehicle of claim 1, wherein the observed energy consumption rate is an actual measured energy consumption rate and the processor is configured to apply the calculated RECF to find a remaining distance until the vehicle runs out of energy.

3. The vehicle of claim 1, wherein the processor is configured to calculate the energy consumption estimate for the current segment based on the RECF for a previous segment, a received speed limit of the current segment, a received ambient temperature, and a received barometric pressure.

4. The vehicle of claim 3, wherein the processor is configured to calculate the energy consumption estimate for the current segment based on received tire pressure and received coolant temperature.

5. The vehicle of claim 3, wherein the processor is configured to calculate the energy consumption estimate for the current segment based on a measured state of one or more vehicle windows.

6. The vehicle of claim 3, wherein the processor is configured to modify the received speed limit of the current segment with a received traffic of the current segment.

7. The vehicle of claim 3, wherein the processor is configured to determine, for each road segment, a stopping likelihood profile that estimates an estimated stopping duration time for the vehicle along the road segment based on an estimated stopping probability for each traffic stop and stop sign identified in the road segment information for the current road segment.

8. The vehicle of claim 1, wherein the processor is configured to determine the energy consumption estimate of the current segment based on whether the vehicle is predicted to turn at each traffic light identified in the road segment.

9. The vehicle of claim 1, wherein the processor is configured to perform the calculation of the RECF for the current segment with the following discrete first order filter equation:

$$R_{route\_corr}(k) = [1-a]R_{route\_corr}(k-1) + a\left[R(k) - \frac{E_{road\_seg\_x}}{D_{road\_seg\_x}}\right]$$

wherein $R_{route\_corr}$ is the calculated RECF, k is a discrete time index, a is a filter constant, $E_{road\_seg\_x}$ is the energy consumption estimate for the current road segment, $D_{road\_seg\_x}$ is a distance of the current road segment, and R(k) is the current observed energy consumption rate.

10. The vehicle of claim 1, wherein the processor is configured to reset the RECF to zero when the user enters a new route.

11. The vehicle of claim 1, wherein the processor is configured to calculate a global energy consumption rate while traversing each segment based on the global energy consumption rate for the previous segment, the observed energy consumption rate, the energy consumption estimate for the current segment, and the distance of the current segment; wherein the global energy consumption rate is an average energy consumption rate over a plurality of road segments.

12. The vehicle of claim 1, wherein the processor is configured to:

estimate a total energy required to traverse the received route;

compare the estimate to a total stored energy;

compute a nominal distance to empty based on a route distance, the total stored energy, the estimate, and a global energy consumption rate.

13. The vehicle of claim 12, wherein the processor is configured to automatically reset the RECF for the current segment to zero upon computing the nominal distance to empty.

14. The vehicle of claim 12, wherein the processor is configured to calculate a distance to empty while traversing each segment based on the nominal distance to empty, a total distance traveled along the route, a total stored energy remaining, a global energy consumption rate, and the calculated RECF.

15. The vehicle of claim 14, wherein the processor is configured to calculate the global energy consumption rate while traversing each segment based on the global energy consumption rate for the previous segment, the observed energy consumption rate, the energy consumption estimate for the current segment, and the distance of the current segment; wherein the global energy consumption rate is an average energy consumption rate over a plurality of road segments.

16. A method of estimated energy consumption in a vehicle having a battery that drives wheels via a motor, the method comprising, with a processor:

breaking a received route into a plurality of segments;

calculating a route energy consumption rate correction factor (RECF) for a current segment as a function of the following received values: a RECF of the previous segment, an observed energy consumption rate, an energy consumption estimate for the current segment, and a distance of the current segment.

17. The method of claim 16, wherein the processor is configured to calculate the energy consumption estimate for the current segment based on the RECF for a previous segment, a received speed limit of the current segment, a received ambient temperature, a received barometric pressure, and a measured state of one or more vehicle windows.

18. The method of claim 16, wherein the processor is configured to:

estimate a total energy required to traverse the received route;

compare the estimate to a total stored energy;

compute a nominal distance to empty based on a route distance, the total stored energy, the estimate, and a global energy consumption rate;

automatically reset the RECF for the current segment to zero upon computing the nominal distance to empty.

19. The method of claim 18, wherein the processor is configured to calculate a distance to empty while traversing each segment based on the nominal distance to empty, a total distance traveled along the route, a total stored energy remaining, a global energy consumption rate, and the calculated RECF.

20. The method of claim 16, wherein the processor is configured to reset the RECF for the current segment to zero when the user enters a new route.

* * * * *